May 15, 1934.   A. ROSENTHAL   1,959,064
FEEDING DEVICE FOR CORN HUSKING MACHINES
Filed Oct. 17, 1930   2 Sheets-Sheet 2
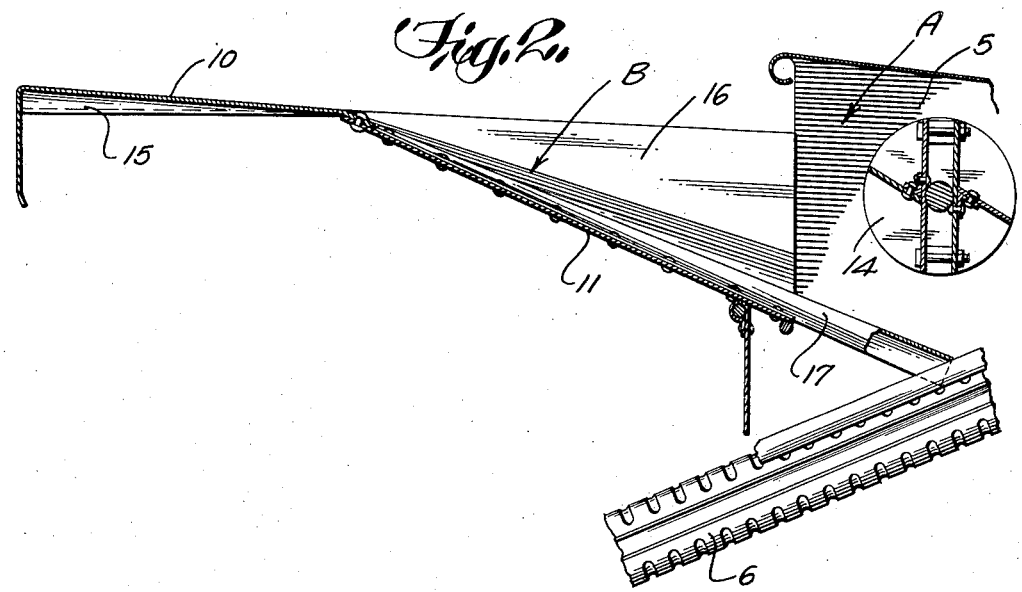
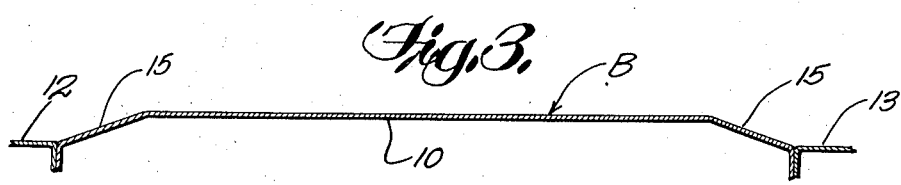
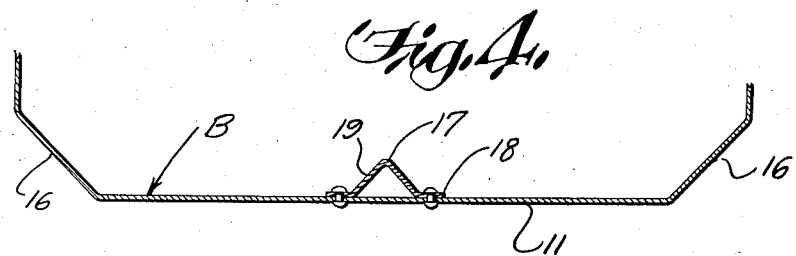
Inventor
August Rosenthal
By
Attorneys Patented May 15, 1934

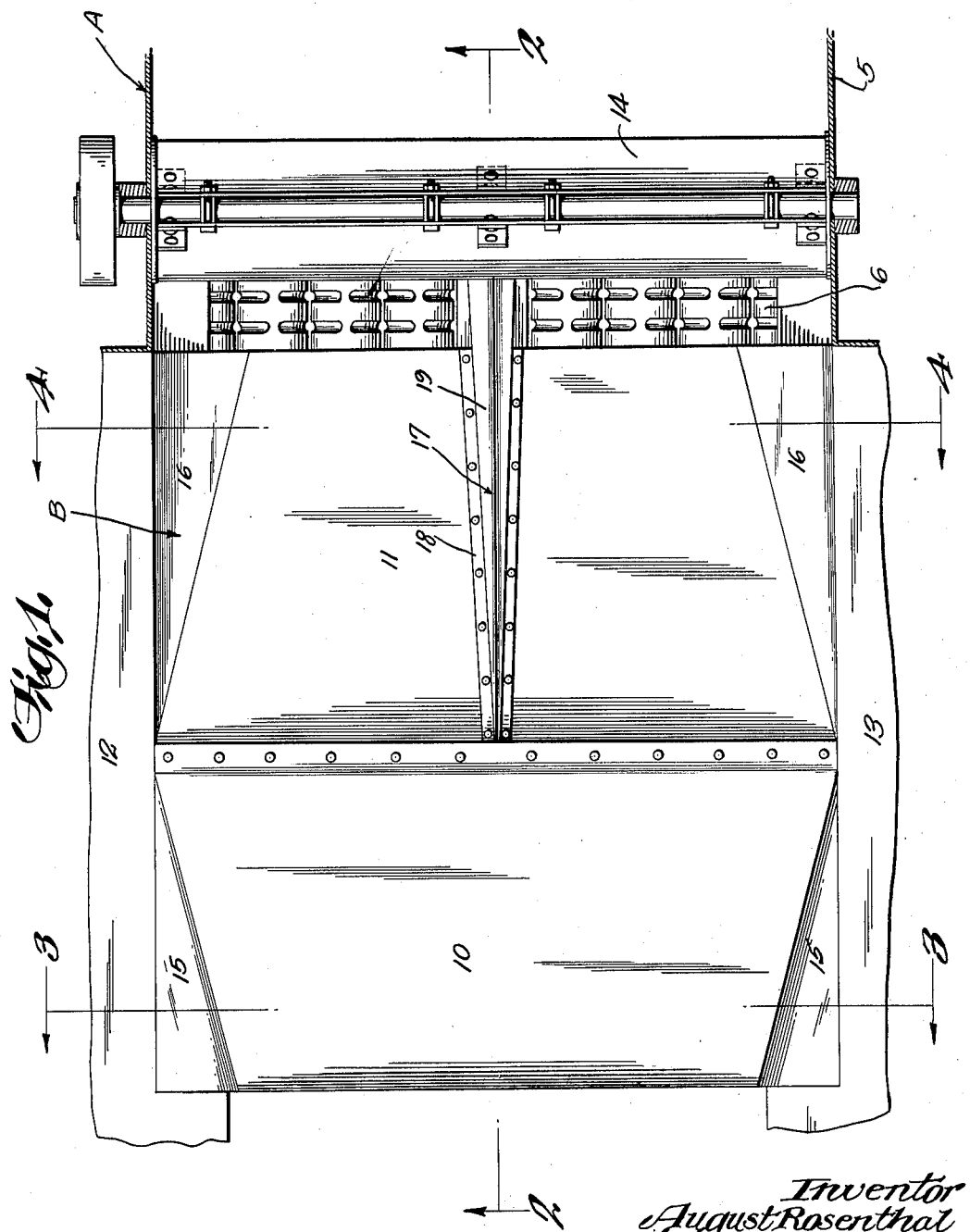

1,959,064

UNITED STATES PATENT OFFICE 1,959,064

FEEDING DEVICE FOR CORN HUSKING MACHINES

August Rosenthal, West Allis, Wis., assignor to Rosenthal Corn Husker Co., West Allis, Wis.

Application October 17, 1930, Serial No. 489,382

1 Claim. (Cl. 130—5)

This invention relates to feeding devices particularly adapted for use on corn husking machines of the type shown in my prior Patents 1,228,971 and 1,629,930 issued to me June 5, 1917 and May 24, 1927 respectively.

One of the primary objects of my invention is the provision of novel means for forming the feeder table so that the material will be readily engaged by the feeder and fed toward the stripping rolls.

Another important object of my invention is the provision of a central divider member carried by the table, so formed as to provide means for evenly distributing the material on the table, whereby the material will be efficiently engaged by the stripping rolls.

A further object of my invention is the provision of novel means formed on the sides of the table and inclining toward the divider member, said means acting to confine the material on the table and holding the material in line during the feeding thereof toward the stripping rolls.

With these and other objects in view the invention consists in the novel construction, arrangement and formation of parts as will be hereinafter more specifically described, claimed and illustrated in the accompanying drawings, in which:

Figure 1 is a top plan view of my improved table showing parts of the corn husking machine in section.

Figure 2 is a longitudinal section through my device taken on the line 2—2 of Figure 1 looking in the direction of the arrows.

Figure 3 is a transverse section through the front of the table taken on the line 3—3 of Figure 1 looking in the direction of the arrows.

Figure 4 is a transverse section through the inner end of the table taken on the line 4—4 of Figure 1 looking in the direction of the arrows.

Referring to the drawings in detail wherein similar reference characters designate corresponding parts throughout the several views, the letter A generally indicates a corn husking machine provided with my improved feeding device B.

The corn husker A is of the general type illustrated in my mentioned patents and includes the side frame walls 5 and the inclined rotatable stripping rolls 6.

My improved feeding device B is located directly above the stripping rolls 6 and is supported by the frame of the machine in any preferred way. The feeding device embodies an outer receiving table portion 10, which may be arranged in a substantial horizontal plane and an inner downwardly inclined feeding portion 11. Arranged on the opposite sides of the table portions 10 and 11 are the side loading platforms 12 and 13 on which the corn stalks are thrown by operators on each side of the machine. These stalks of corn are moved off the loading platforms 12 and 13 onto the portions 10 and 11 of the feeding table by an operator standing on the operator's platform (not shown) in rear of the table.

The portions 10 and 11 of the table and the loading platforms 12 and 13 can be formed from any desired material such as sheet metal of the required gage.

The formation of the portions 10 and 11 of the table form a salient feature of my invention and by the construction thereof I am enabled to properly distribute the material on the table and hold the same in line and properly feed the material to the stripping rolls.

Arranged directly in front of the inner feeding portion 10 of the table and directly above the upper ends of the stripping rolls 6 is the rotatable feeder 14 which acts to pull the material off the table into engagement with the stripping rolls. The feeder or beater 14 acts to compress and turn the material so as to direct the same in a substantially vertical path toward the stripping rolls. The same also has a regulative effect on the material.

The side faces of the receiving portion 10 of the feeding table are inclined downwardly and outwardly as at 15 toward the opposite loading platforms 12 and 13 which facilitates the pushing of the corn shocks and stalks onto the table, it being noted that the inclined portions 15 gradually decrease toward the feeding portion 11 and merge with the inner edge of the portion 10. The initial receiving portion 10 of the table while lying substantially in a horizontal plan, has a gradual incline downwardly toward the feeding portion 11.

The feeding portion 11 of my table inclines downwardly and inwardly at a decided angle toward the upper ends of the stripping rolls 6 and the side walls of the table portion 11 are inclined inwardly and downwardly as at 16 toward the longitudinal center of the table portion 11.

These inclined side walls 16 of the table portion 11 gradually widen toward the lower end of the table portion 11 to conform to the downward pitch of said table portion 11. These inclined side walls lead from the loaded platforms 12 and 13, as shown, and act to confine the stalks on the table and hold the same in proper line to be acted upon by the stripping rolls.

Another important feature of my present invention is the provision of a central dividing member 17 for the corn stalks. This central dividing member 17 is in the nature of a divider rib or partition and is of a substantial inverted V-shape in cross section having attached base flanges 18 which are riveted or otherwise rigidly secured to the upper face of the feeder table. By providing the dividing member of a substantial V-shape in cross section, I provide inclined sides 19 which tend to evenly distribute the material on each side of the table. This dividing member gradually flares toward its lower end and extends an appreciable distance beyond the lower edge of the feeding portion 11 of the table and terminates below the rotatable feeder 14.

From the foregoing description it can be seen that I have provided a feeding table for corn husking machines which is so constructed as to facilitate the placing of the corn stalks thereon and to properly feed the stalks and distribute the same evenly to the stripping rolls.

Changes in details may be made without departing from the spirit or the scope of this invention but what I claim as new is:

The combination of a corn husker having rotatable stripping rolls, a feeding table including a corn stalk receiving portion and a downwardly inclined feeding portion leading toward said rolls, loading platforms arranged on opposite sides of the table, the receiving portion having outwardly and downwardly inclined sides leading toward the loading platforms, downwardly and inwardly inclined sides formed on the feeding portion leading from said loading platforms, and a central dividing and distributing member carried by the inclined portion extending longitudinally thereof equidistantly between the inclined sides thereof, said dividing and distributing member being of an inverted V-shape in cross section and gradually flaring from the outer end thereof toward the inner end thereof.

AUGUST ROSENTHAL.